United States Patent
Yudowitch

(10) Patent No.: US 12,003,593 B2
(45) Date of Patent: Jun. 4, 2024

(54) NETWORK ENTITY MODELING

(71) Applicant: Evernorth Strategic Development, Inc., St. Louis, MO (US)

(72) Inventor: Ross Yudowitch, West Hartford, CT (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 0 days.

(21) Appl. No.: 17/856,514

(22) Filed: Jul. 1, 2022

(65) Prior Publication Data
US 2024/0007541 A1     Jan. 4, 2024

(51) Int. Cl.
H04L 67/51 (2022.01)
H04L 41/12 (2022.01)
H04L 41/14 (2022.01)

(52) U.S. Cl.
CPC ............. *H04L 67/51* (2022.05); *H04L 41/12* (2013.01); *H04L 41/14* (2013.01)

(58) Field of Classification Search
CPC .......... H04L 41/12; H04L 41/14; H04L 67/51
See application file for complete search history.

(56) References Cited

U.S. PATENT DOCUMENTS

| | | | |
|---|---|---|---|
| 7,401,048 B2 | 7/2008 | Rosedale | |
| 9,129,212 B2 | 9/2015 | Sinha | |
| 9,584,374 B2 | 2/2017 | Bingham | |
| 9,699,209 B2 | 7/2017 | Ng | |
| 10,445,371 B2 | 10/2019 | Brave | |
| 10,503,911 B2 | 12/2019 | Chari | |
| 10,572,541 B2 | 2/2020 | Fletcher | |
| 10,638,356 B2 | 4/2020 | Andrews | |
| 10,673,891 B2 | 6/2020 | Lee | |
| 11,044,139 B1* | 6/2021 | Farber | H04L 41/0266 |
| 2016/0366176 A1 | 12/2016 | Bennison | |
| 2019/0166007 A1* | 5/2019 | Sundaram | H04L 43/045 |
| 2019/0245757 A1* | 8/2019 | Meyer | H04L 41/5051 |
| 2019/0271978 A1* | 9/2019 | ElBsat | G05B 15/02 |

\* cited by examiner

*Primary Examiner* — Gil H. Lee

(74) *Attorney, Agent, or Firm* — Schwegman Lundberg & Woessner, P.A.

(57) ABSTRACT

System and techniques for network entity modeling are described herein. A set of network entities is obtained in which a first member of the set of network entities hosts a first service and, when in operation, has a connection to a second member of the set of network entities hosting a second service. A direct efficiency score is calculated for the first member of the set of network entities. The direct efficiency score is based on first resources required to use the first service. An aggregate efficiency score is also calculated based on second resources required to use the second service on the second member via the first member and the connection. Then a representation of the first member is provided that includes the direct efficiency score and the aggregate efficiency score.

24 Claims, 7 Drawing Sheets

NETWORK ENTITY MODELING

TECHNICAL FIELD

Embodiments described herein generally relate to computer-based modeling and more specifically to network entity modeling.

BACKGROUND

Computer modeling incorporates data into models to produce output that, for example, is used to inform design, implementation, or other decisions. Computer modeling can be incorporated into automated systems to drive decisions of a system without human intervention. Computer modeling models may be mathematical, exemplary (e.g., follow a series of examples), statistical, artificial neural network, among others, in nature. A computer modeling system may encompass a system configured to ingest data, apply one or more models to the data, and produce an output based on the applications of the one or more models to the data.

Networks are populations of entities and connections between those entities. The nature of connections can vary between entities. Thus, for example, a television broadcast is a unidirectional connection from a transmitter to a television. Although bidirectional connections are common—such as in an Ethernet connection between two computers—such bidirectional connections need not be symmetrical. Thus, communication between a cellular base station (e.g., an ng-eNodeB) and a mobile phone (e.g., user equipment) is bidirectional, the base station governs most of the connection parameters.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
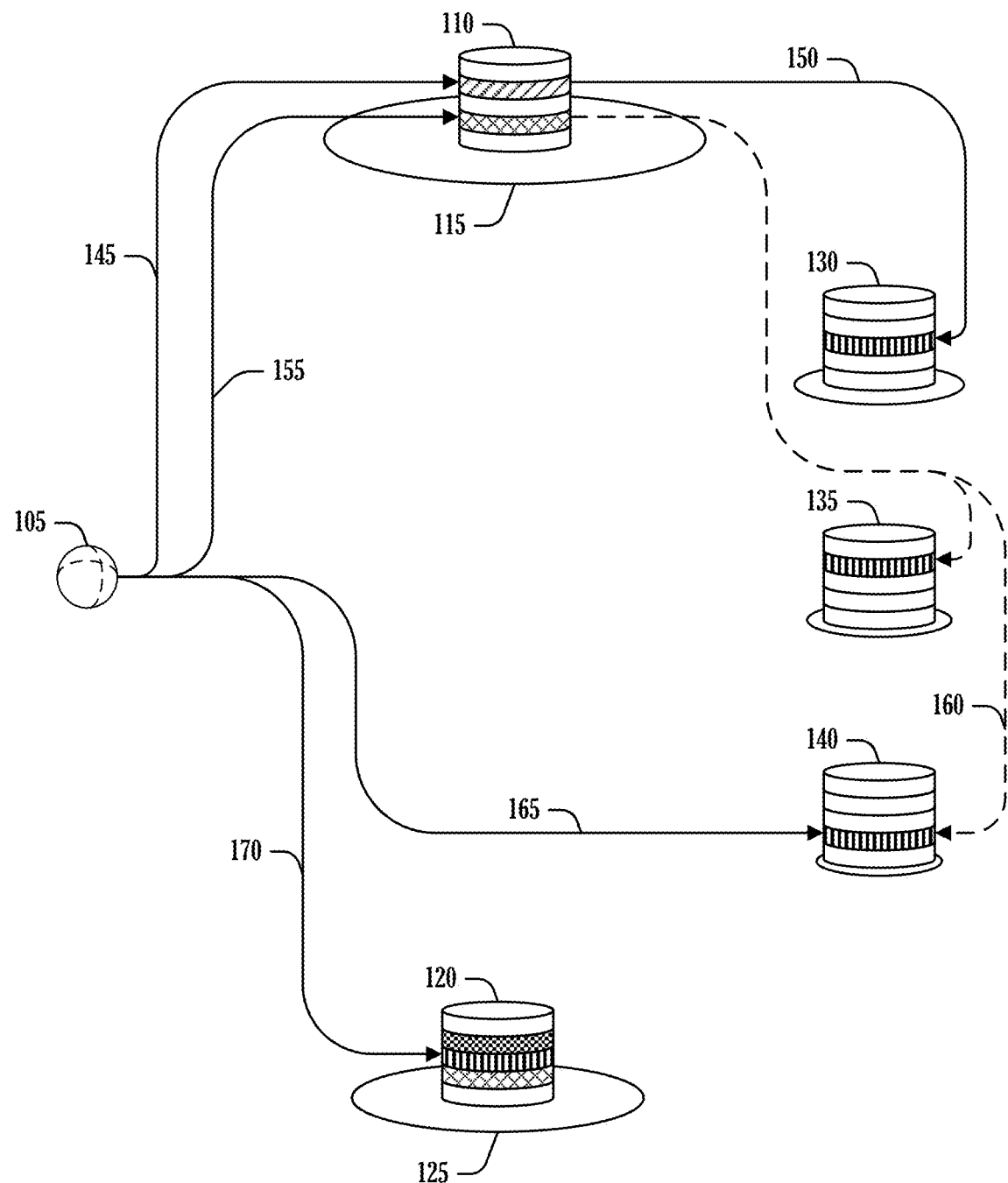
FIG. 1 illustrates an example of an environment for network entity modeling, according to an embodiment.

Because the number and types of entities, and the number and types of connections, can be large, understanding how a network will behave may be challenging. In simple networks, use impact metrics for using a first node over a second node to perform a service may be compared to establish which use patterns are more efficient. However, as network complexity grows—where services are not directly accessible and connections between various nodes are numerous leading to an explosion of connection combinations—such ready analysis may be elusive. An inability to established efficiency of service use may result in a poorly understood and poorly performing network.

As complexity increases in network analysis, some basic guiding principles may replace quantitative analysis. For example, a number of network hops (e.g., devices through which a request may pass) may be used as a metric to determine network efficiency. In an example, single hop analysis may be performed to select a first request routing while further hops remain un-analyzed. However, while these "rules of thumb" approaches reduce the analytical complexity, they often yield suboptimal network designs.

To address these issues, a network entity modeling approach that enables near first hop analysis speed with more detailed efficiency results for multi-hop service use is described herein. This modeling begins by obtaining services and impact metric—the penalty in resource consumption for using the services—for individual network nodes. This collection may be performed infrequently when the services and impact metric change infrequently. Further, at this juncture, the collection may be performed without respect to any connections available to a given network entity. Accordingly, even in highly connected networks, the collection workload scales linearly with the number of nodes providing services.

Once the service and impact metric data are gathered for the network entities, a direct efficiency score may be calculated for each entity. Here, the direct efficiency score is based on the resources required to use a given service as derived from the impact metric. Accordingly, from the direct efficiency score, an impact from directly using the network entity for the service may be determined. An aggregate efficiency score also may be calculated. Here, the aggregate efficiency score considers connections from the network entity to another network entity that make a second service available. This second service may be in furtherance of a defined "complete network" of interrelated services. For example, a video decoding and streaming network may have a first service to encode the video and a second service to transmit the video. Here, the first and second service are combined to create the complete video encoding and streaming network.

The aggregate efficiency score calculation essentially entails a direct efficiency score calculation for the second network entity to create a value that is attributed to the network entity. Multiple of these values may be aggregated to produce a single valued aggregate efficiency score for multiple secondary network entities providing the second service. In this manner, a compact and efficiently computed picture of downstream service availability and impact of use is represented in the aggregate efficiency score. By attributing the aggregate efficiency score to the first network entity, services available through, but not on, the network entity are also attributed to the network entity via the aggregate efficiency score. Accordingly, a look at available services is obtained. In an example, the aggregate efficiency score aggregates impact metrics from each in a chain of network entities to provide a service. Thus, for example, if Service X is available in three hops, the network impacts of the intervening network entities (the three hops) are added together to produce the single aggregate efficiency score for that service.

Once the efficiency score is produced, it is provided to model the network entities. For example, the efficiency score may be provided by a user interface indicating available network configurations and impact metrics for these networks. Further, the scores may be used to efficiently sort directly connected network entities for a given service to automatically model configurations of services available from first tier network entities and establish the most efficient collection of available network entities to construct a complete network. Further, if services to the complete network are changed, a new sorting may be made quickly based on the available efficiency scores. Thus, real-time modeling of complex network interactions may be achieved. Additional examples and details are provided below.

FIG. 1 illustrates an example of an environment for network entity modeling, according to an embodiment. Several nodes are illustrated in the environment, including a consumer node 105, service provider node 110, service provider node 120, service provider node 130, service provider node 135, and service provider node 140. Service provider nodes that are directly connected to the consumer node 105 may be referred to as primary service provider nodes and service provider nodes that are connected to the consumer node 105 through another service provider node may be referred to as secondary service provider nodes. Thus, service provider node 110 is an example of a primary service provider node, service provider node 130 is an example of a secondary service provider node, and service provider node 140 may be either.

Each service provider node provides one or more services to service requests from the consumer node 105. These services are illustrated as vertically stacked disks and shaded to indicate the same service across different service provider nodes. An unshaded disk indicates that a service may or may not be present but is not relevant to modeling the use of the network by the consumer node 105. The oval below each stack of service disks indicates an impact of using a service—such as consumption of a resource including power, space, heat, consumables (e.g., single use power-cells), or currency—on a given service provider node. This resource consumption may be called an impact metric. Thus, for example, using services on the service provider node 110 involves an impact metric 115 that is larger than the impact metric 125 for using a service on service provider node 120. The other illustrated impact metrics for service provider node 130, service provider node 135, and service provider node 140 are smaller still.

The connections established, when in operation, from the consumer node 105 define primary service provider nodes and secondary (or tertiary, etc.) service provider nodes. As illustrated, a solid line indicates a direct request from the consumer node 105 and a dashed line indicates a request that was implicit from a request from the consumer node. Thus, for example, the request 145 is a request that, by definition, will result in the request 150 from the service provider node 110 to the service provider node 130 for the vertically shaded service on service provider node 130. Accordingly, the diagonally dashed service on the service provider node 110 may be a referral service (e.g., a forwarding service, directory, etc.) to which the request 145 was made with the intention to invoke the service on the service provider node 130. In contrast, the request 155 results in an implicit request 160 to the vertically shaded service on the service provider node 140. Here, the request is subject cross-shaded service on the service provider node 110. For example, if the cross-shaded service were encrypting a video file, the vertically shaded service on the service provider node 140 may include a final packaging element that is not resident on the service provider node 110. The further request 165 and request 170 also indicate consumer node 105 attempts to directly engage the vertically shaded service on the service provider node 140 and the service provider node 120 respectfully.

Given the illustrated context described above, the following described the operation of a system within this context. The system includes processing circuitry—such as central processor units (CPUs), graphic processing units (GPUs) or other accelerators (e.g., field programmable gate arrays (FPGAs))—and computer readable media to hold instructions or data to configure the processing circuitry when in operation. The system may include one or more network interfaces to obtain (e.g., retrieve or receive) data in a wired or wireless manner. The system may include one or more output devices to control other hardware or to provide data to a human, for example, by rendering information on a monitor or producing audible or haptic feedback.

The processing circuitry—e.g., when in operation and configured by instructions from the computer readable media—is arranged to obtain a set of network entities. For example, the processing circuitry receives a list that includes the service provider node 110, the service provider node 120, the service provider node 130, the service provider node 135, and the service provider node 140. The list may have been previously stored on the computer readable media, obtained by request through network connection to a remote data repository, or entered in a user interface among other possibilities.

The data received about the network entities includes services available on each. Thus, for example, a first member of the set of network entities hosts a first service and, when in operation, the first member has a connection to a second member of the set of network entities that hosts a second service. This example is illustrated in the relationships between the service provider node 110 and any of the service provider nodes 130, 135, or 140. In an example, the first member also hosts a third service. This third service is a referral service to use the second service (of the second member) via the connection between the first member and the second member. This example discussing the third service is more specifically illustrated between the service provider node 110 and the service provider node 130. As noted above, the request 150 may be generated by the referral service (cross-shaded service of the service provider node 110) as opposed to the implicit (e.g., not explicitly request by the consumer node) connections (e.g., request 160) to the service provider node 135 or the service provider node 140.

In an example, the connection between the first member and the second member is an implicit connection. Implicit connections occur via operation of the service providing node rather than by a direction from the consumer node 105 to use a particular second node. Such implicit connection may occur by operation of a load balancer or, in human networks, referral by a generalist to a specialist. However, implicit connections imply that the relationship between the first member and the second member are not known. Accordingly, there is not a network definition requiring (e.g., a defined chaining) of the first member and the second member together.

In an example, the implicit connection is determined based on user use of the first service and the second service. In the video stream example given above, the streaming service may not be explicitly requested by the consumer node 105. However, a common transaction identifier (ID) or the like may be used to ascertain that the execution of the streaming service was part of the original request by the consumer node 105. Thus, the user (e.g., consumer node 105) used both services. These correlations, as determined through transaction ID, billing, scheduling, referral records, etc. are used to establish the implicit connections. In an example, the implicit connection is determined based the user use of the first service and the second service within a time window. This example recognizes that time-bounding correlative records may be necessary. For example, if the video encoding service were used by the consumer node on a first day and the stream service on a second service provider node on a second day, it is unlikely these are part of a single act (e.g., video encoding and streaming transaction). However, if these same uses are within a second or sub-second interval, then the likelihood that they are related is higher. The time window (which may include a start time greater than zero to filter out simultaneous activity by the consumer node 105) provides a bound by which to establish a relationship between the service use records.

In an example, the implicit connection is determined based the user use of the first service and the second service for a treatment. This example reflects a human oriented network, such as a medical care network. Here, the first service may be a general practitioner service that leads to a referral and use of a specialist. The second service may also be a hospital, imaging (e.g., radiological service) etc. Accordingly, in an example, the first service is a medical procedure (e.g., radiotherapy for cancer). In an example, the first member is a building (e.g., a clinic or a hospital). In an example, the first member is a medical professional. In an example, the medical professional is a physician.

The processing circuitry is arranged to calculate a direct efficiency score is calculated for the first member of the set of network entities. Here, the direct efficiency score is based on first resources required to use the first service. As noted earlier, the resources required to use the first service are represented by the impact metric 115 or the impact metric 125 for the service provider node 110 and the service provider node 120 respectfully. In an example, the first resources are a cost of using the first service over several uses. Here, the direct efficiency score is calculated by dividing the cost by the several uses. While cost may refer to currency expenditure, cost may also refer to expenditures of power, space, time, etc. These examples illustrate the average of per-use impacts as a statistical metric for modeling. Other statistical modeling techniques may be used in addition or instead of averaging, such as median. In any case, however, the result is the exchange required to use the service for future uses as defined by the model.

The processing circuitry is arranged to calculate an aggregate efficiency score. In this context, the aggregate efficiency score combines one or more secondary services available to the first network entity member when in operation. For example, the illustrated vertical shaded service at the service provider node 130 would contribute to the aggregate efficiency score for the service provider node 110. Like the direct efficacy score, the aggregate efficiency score is based on second resources required to use the second service on the second member via the first member and the connection. As noted above, these are illustrated via the impact metric ovals of each illustrated service provider node.

The aggregate efficiency score may apply to explicit and implicit connections to the first member. Accordingly, in an example, the first member includes the third service—the referral service to the second member—and the second resources include third resources required to use the third service. Thus, the third services impact the aggregate efficiency score.

The aggregation of the aggregate efficiency score may be depth-based—such that impact metrics for each hop in a multiple hop service are combined—breadth based—such that impact metrics for each second member directly accessible to the first member are combined—or a combination of the two. When combining the impact metrics, simple addition may be used. However, in breadth-based aggregation—where several nodes may be employed for a single service—the combination may include selecting an extremum (e.g., a minimum or a maximum) impact metric for the aggregate efficiency score. In an example, an average, or weighted average, may be used to represent the ability to achieve a given impact metric. For example, if two service providers provide the same service, and the service provider with the lower impact metric is twice as likely to be available, a weighted average may include multiplying the lower impact metric by two, adding the result to the higher impact metric, and dividing the sum by three to arrive at the aggregate efficiency score.

In an example, the aggregate efficiency score is a single value that represents the impact (e.g., required resources) on the network of using a service through the first network entity member. This single number facilitates ready computation and sorting to determine which network entities may provide an optimal arrangement of available network entities from which to construct a complete network.

The processing circuitry is arranged to provide a representation of the first member that includes the direct efficiency score and the aggregate efficiency score. As noted above, providing the aggregate efficiency score includes transmitting the aggregate efficiency score, displaying the aggregate efficiency score, writing the aggregate efficiency score to a data structure (e.g., stored on a computer readable medium), or otherwise deliver the aggregate efficiency score for use in network entity modeling.

In an example, the processing circuitry is arranged to obtain a service set that defines a complete network. Here, a service set is a set of services that, together, are the complete network. Examples may include a dental service, a general practitioner service, and a clinic in a medical network context. In a computer network context, the Example may include a routing service, a load balancing service, and a gateway service. The service set enables the processing circuitry to establish minimum services to complete the network according to the model. In an example, providing the representation of the first member includes providing an indication that either the first service or the second service is in the service set. Here, the user interface may highlight, encircle, or otherwise provide this indication to a user.

In an example, the processing circuitry is arranged to normalize the first service to create a normalized first service. Here, providing the indication that the first service is in the service set includes comparing the normalized first service to members of the service set to find a match. These examples address a situation in which services are essentially equivalent (e.g., equivalent within a predefined tolerance) but defined (e.g., referred to) differently. The normalization enables these essentially equivalent services to be considered as the same service for eth various operations described herein. In an example, normalizing the first services includes obtaining service groupings—a given service grouping including multiple services predefined to be equivalent—finding the first service in a service grouping, and using the service grouping as the normalized first service. Here the service set members are service groupings. Other techniques may also be used, such as regular expression matching on service names, or a confluence of implicit connections as determined by, for example, an artificial neural network trained to recognize service use.

In an example, the processing circuitry is arranged to generate a subset of network entities from the set of network entities that includes the first member based on the service set and the aggregate efficiency score. This is an example of explicit modeling to include the network entities that contribute to a complete network with low (e.g., minimum) required resources—represented by the direct and the aggregate efficiency scores—to use the services therein. In an example, the service set is subject to a geographic limitation. Here, generating the subset of network entities includes eliminating members of the set of network entities that do not meet the geographic limitation.

In an example, generating the subset of network entities that includes the first member based on the aggregate efficiency score includes determining that the first member is not in the subset of network entities based on the direct efficiency score. The aggregate efficiency score may then be compared with direct or aggregate efficiency scores for other members of the set of network entities to determine that the first member is included in the subset of network entities. This example illustrates that a large impact metric may be overcome to include the first member if the aggregate efficiency score of the service is sufficiently small when compared to other network entities. Accordingly, under a simple direct efficiency score evaluating, the first member would not be included in the provided subset of network entities. However, the connections (e.g., relationships) of the first member enable additional efficiencies when secondary service provider services are used.

Figure 2:
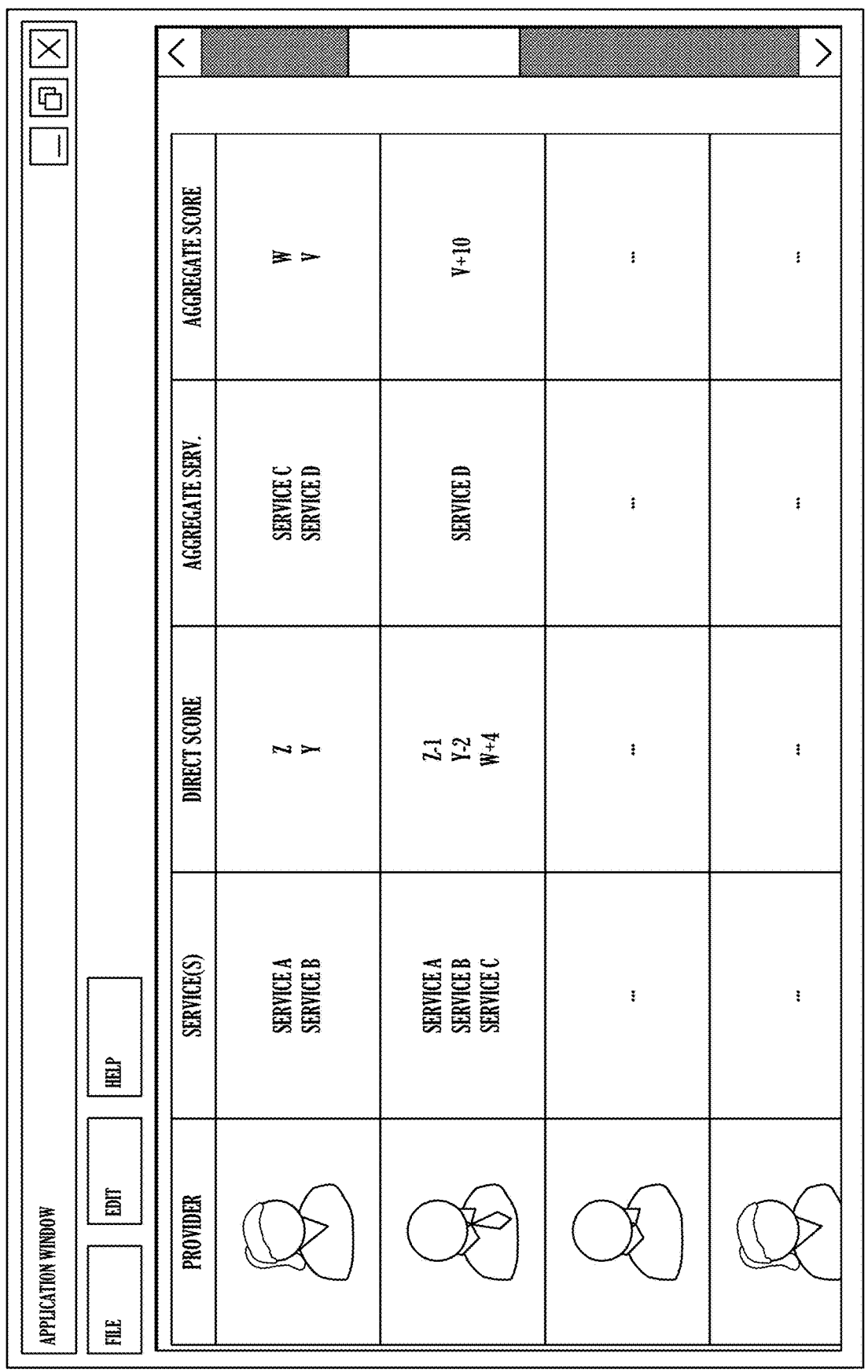
FIG. 2 illustrates an example of a user interface for network entity modeling, according to an embodiment.

In an example, the processing circuitry is configured to provide a user interface. In an example, the user interface is configured to display the subset of network entities including the first member. In an example, the user interface is configured to display the direct efficiency score. In an example, the user interface is configured to display the aggregate efficiency score. In an example, the user interface is configured to display a contribution of the first member to completion of the service set. An example of this interface is illustrated in FIG. 2.

In the context of the above, consider the following example of network entity modeling using secondary, or aggregate efficiency scores. Table ! provides a listing of data related to a medical services network and scores related to services therein.

TABLE 1

| Row | Column 1 | Column 2 | Column 3 | Column 4 | Column 5 | Column 6 |
|---|---|---|---|---|---|---|
| B | | Scenario Status | INN/ONN | INN | INN | OON |
| C | | Facility US PI | Units | Specialist 1 | Specialist 2 | Specialist 3 | Total |
| D | 1.3 | | Hospital A | 10 | 55 | 90 | 155 |
| E | 1.1 | | Hospital B | 30 | 20 | 10 | 60 |
| F | 0.9 | | Hospital C | 60 | 25 | 0 | 85 |
| G | | | Units | 100 | 100 | 100 | 300 |
| H | | | Provider RBRVS % | 130% | 145% | 110% | |
| I | | | Professional Efficiency (Before) | 0.96 | 1.07 | 0.81 | 0.95 |
| J | | | Facility Efficiency (Before) | 1.00 | 1.16 | 1.28 | 1.15 |
| K | | Unit | Hospital A | 5 | 27.5 | 0 | 32.5 |
| L | | Steerage | Hospital B | 15 | 10 | 0 | 25 |
| M | | | Hospital C | 30 | 12.5 | 0 | 42.5 |
| N | | Final | Hospital A | 15 | 82.5 | 0 | 97.5 |
| O | | Units | Hospital B | 45 | 30 | 0 | 75 |
| P | | | Hospital C | 90 | 37.5 | 0 | 127.5 |
| Q | | | Specialist Totals | 150 | 150 | 0 | 300 |
| R | | | Facility Efficiency (After) | 1.00 | 1.16 | 1.28 | 1.08 |
| S | | | Professional Efficiency (After) | 0.96 | 1.07 | 0.81 | 1.02 |

For clarity, the rows and columns of Table 1 are included in the table such that accurate referral to particular elements of Table 1 may be made below.

With respect to columns 3-5, the corresponding rows include the experience of specialists within the same specialty. In an example, utilization shifts are done at a specialty level.

With respect to row B, row B is a Scenario Status. All specialists are considered In Network (INN) at the beginning of the model. OON stands for Out of Network.

With respect to row C, row C includes the names of the specialists in the network. In the example of Table 1, these names are Specialist 1, Specialist 2, and Specialist 3.

With respect to rows D-F, each of these rows represents a breakdown of the specialist utilization of each of the 3 hospitals. For example, out of 100 total units for Specialist 1, 10 units were associated with Hospital A, 30 units with Hospital B, and 60 units to Hospital C. This may be referred to as Specialist 1 hospital utilization distribution.

With respect to cells D1, E1, and F1 (rows D-F in Column 1), a Hospital's Unit Cost (UC) Performance Index (PI) Score is given. Accordingly, Hospital A has a UC PI of 1.3 meaning that the average unit cost per unit of Hospital A is 30% higher than that of the general market. Hospital B has a PI of 1.1 and Hospital C has a PI of 0.9.

With respect to row G, row G includes a total number of units aligned to the specialists. In this example each specialist has 100 units.

With respect to row H, row H includes a specialists Resource Based Relative Value Scale % (RBRVS %) which is used as the specialist unit cost. In an example, a market RBRVS % may be included that is the average market RBRVS % for the specialty of specialist 1, 2, and 3. In the example of Table 1, the market RBRVS % is 135%.

With respect to row I, row I is the specialist Professional Efficiency or their Unit Cost Performance Index. This field is calculated by taking the specialists RBRVS % and dividing it by the Average Market RBRVS % for the specialty.

With respect to cell 16, this is the aggregate Professional Efficiency for all the specialist in this model.

With respect to row J, row J includes a Facility Efficiency score for the specialist. This is the blended Facility PI based on the specialist Utilization. Facility Efficiency=(Hospital A PI)*(Hospital A Units)+(Hospital B PI)*(Hospital B Units)+(Hospital C PI)*(Hospital C Units)/Total Units. In the example of Table 1, cell J3=[1.3*(10)+1.1*(30)+0.9*(60)]/100.

With respect to cell J6, cell J6 is an aggregate Facility Efficiency for all the specialist in this model.

Rows K-Q of Table 1 illustrate an example of how units shift based on removing a provider from the network. Considering rows K-M, in the example of Table 1, the Specialist 3, who's units are represented in column 5, is being removed from the network (OON). Those 100 Units are redistributed to the remaining two specialist in the network. The values in array K3:M5 represent the utilization distribution of the remaining in network specialist. 5% of the OON specialist will be shifted to Specialist 1/Hospital A, 15% Specialist 1/Hospital B, 30% Specialist 1/Hospital C, 27.5% Specialist 2/Hospital A, 10% Specialist 2/Hospital B, and 12.5% Specialist 2/Hospital C.

With respect to rows N-P, these rows include the final units for each specialist at a given hospital after the specialist who's been removed from the networks units have been redistributed.

With respect to row Q, row Q illustrates new total units for each specialist. At the beginning of the example, each specialist had 100 units with a total of 300 units. After specialist 3 has been removed, specialist 1 and specialist 2 now have 150 units each. Thus, the total units at the end match the total units at the beginning of the example.

Rows R and S illustrates a change in network efficiency. With respect to row R, Facility Efficiency scores do not change for the individual specialist/hospital intersection. Accordingly, the values in the columns of row R are the same for both (Before, row J) and (AFTER). The formula for calculating the overall Facility efficiency is the same as in row J except the units from rows N, O, and P are used instead of those from rows D, E, and F.

With respect to row S, the Professional Efficiency scores do not change for the individual specialist/hospital intersection. Accordingly, the values in the columns of row S are the same for both (Before, row I) and (AFTER). The formula for calculating the overall Professional efficiency is the same as in row I except the units from rows N, O, and P are used instead of those from rows D, E, and F.

To determine a change in efficiency scores for the model, a PI Delta may be calculated. Consider:

| Setting | % Allowed | PI Delta |
|---|---|---|
| Facility | 70% | −0.07 |
| Professional | 30% | 0.07 |
| Total | 100% | −0.026296296 |

Again, the Pi Delta is the change in the efficiency scores. In this example, for Facility, Pi Delta is calculated by row R minus row J (1.08-1.15) and row S minus row I (1.02-0.95) for Professional. The % Allowed represents the market share based on a setting. The total Pi Delta is derived by taking the change in efficiency score for professional and facility and blending them using their corresponding market share to arrive at an overall efficiency result. In this example the formula is 0.7*(−0.07)+0.3*(0.07)=−0.0263 or a net savings of 2.63%.

The following Table 2 provides an example of modeling member (e.g., consumer node) disruption.

TABLE 2

| Scenario Status INN/OON | | Hospital A | Hospital B | Hospital C | Unique Patients |
|---|---|---|---|---|---|
| INN | Specialist 1 | 8 | 25 | 50 | 83 |
| INN | Specialist 2 | 55 | 19 | 23 | 97 |
| OON | Specialist 3 | 88 | 10 | 0 | 98 |
| Total | | | | | 278 |

In the example of Table 2, the columns with the Hospitals (e.g., columns 3-5 above) represent the unique number of patients aligned to the 300 units described previously. The last column contains the count of total unique patients aligned to the specialists.

Member disruption is a unique number of patients that would be impacted by the proposed change to the network (e.g., removing Specialist 3). In this example 98 patients would be disrupted out of a unique population of 278 patients. This equates to a member disruption of 35%.

A note about constraints. Each individual use case may use different constraints to define a successful model (e.g., a complete network). A common goal when creating High Performance Networks is to derive at least 10% network savings while disrupting less than 30% of the consumers. With the savings at only 2.63% and a consumer disruption of 35%, removing specialist 3 would be deemed a poor choice in the example illustrated in Table 1 and Table 2.

FIG. 2 illustrates an example of a user interface for network entity modeling, according to an embodiment. The service providers are illustrated in the left-most column, the services follow, then a direct efficiency score. The last two columns indicate which additional services are available via connections provided by the service provider (e.g., aggregate services) and the corresponding aggregate efficiency score for those aggregate services. In an example, other visual representation may be used, such as the graphical complete network elements illustrated in FIG. 3.

Figure 3:
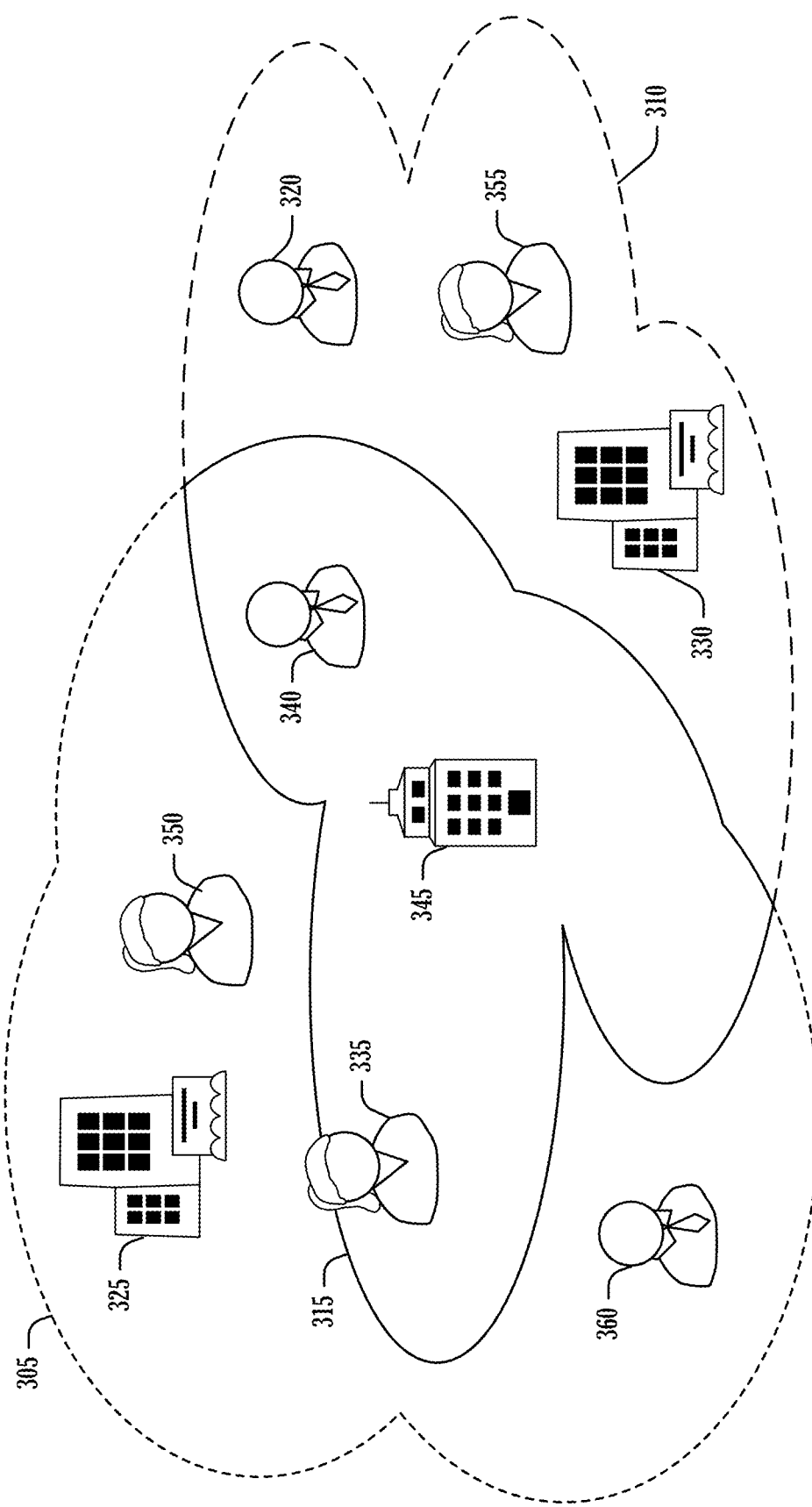
FIG. 3 illustrates an example of network entity impact, according to an embodiment.

FIG. 3 illustrates an example of network entity impact, according to an embodiment. As illustrated, the collection of network entities—such as hospitals 325 and 330, clinic 345, or physicians 350, 335, 360, 340, 320, or 355—are enclosed in two shapes that represent a first subset of network entities 305 and a second subset of network entities 310 that each represent a complete network. Illustrated here is the intersection 315, which includes necessary elements—physicians physicians 335 and 340, as well as clinic 345—in each iteration of a complete network. These elements in the intersection 315 may be necessary to a complete network due to a concentration of efficient connections, for example to either hospital 325 or hospital 330, to fill out necessary services for the complete network.

Figure 4:
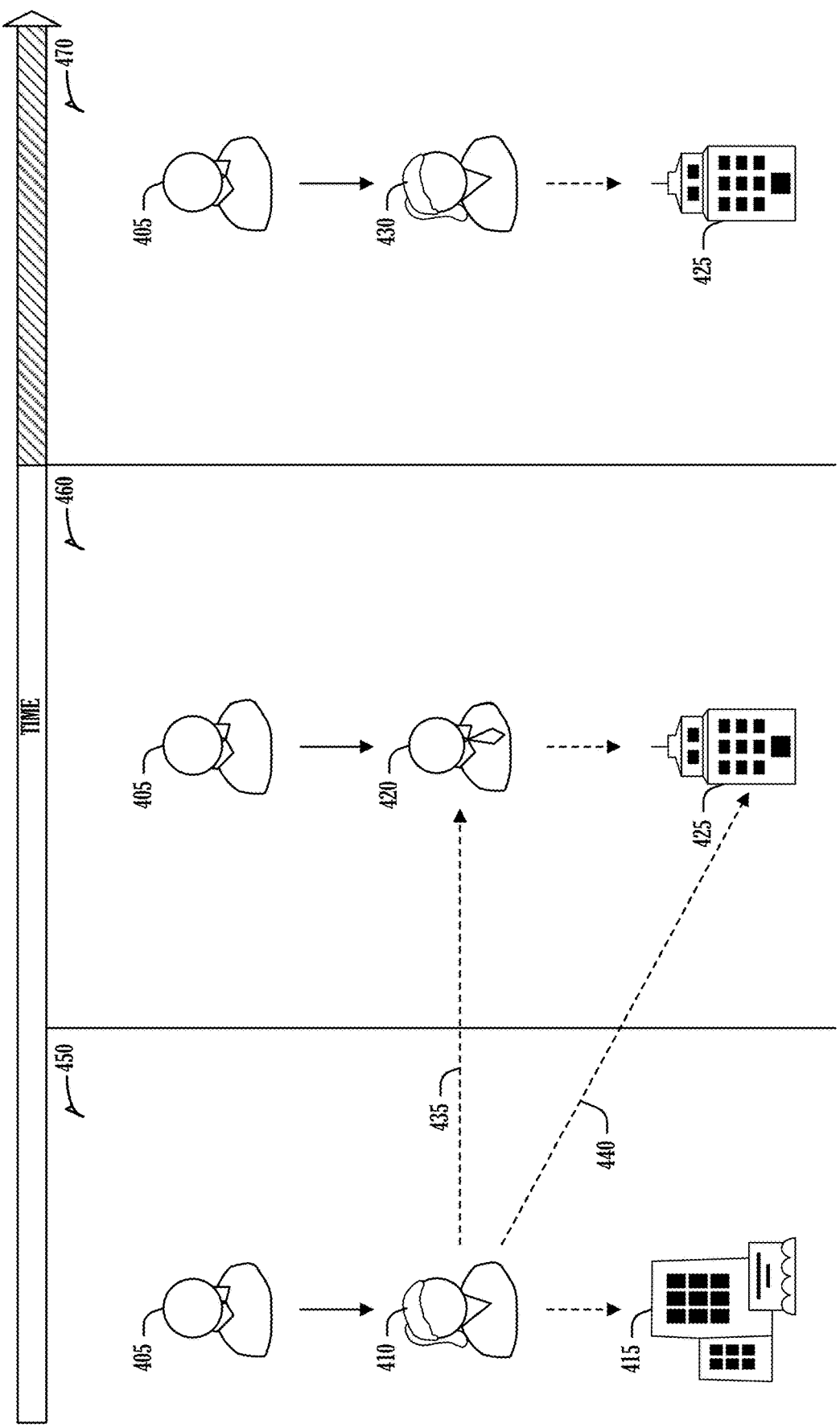
FIG. 4 illustrates an example of time-based interactions to determine an implicit connection, according to an embodiment.

FIG. 4 illustrates an example of time-based interactions to determine an implicit connection, according to an embodiment. Here, there are three illustrated time periods, time period A 450, time period B 460, and time period C 470. Time period A 450 illustrates a consumer 405 (e.g., a patient) visiting a service provider 410 (e.g., a physician). This interaction uses the service provider 415 (e.g., a hospital). The consumer may be given one of several directions, such as a referral 435 to service provider 420 or a referral 440 to service provider 425. Note, the consumer use of either service provider 420 or service provider 425 occurs in time period B 460. However, both time period A 450 and time period B 460 occur within the illustrated time window (unshaded portion of the arrow at the top of the diagram) into which activities of service providers are implicitly tied to a consumer request. That is, the referrals 435 and 440 are treated as implicit connections for the service provider 410 based on the consumer activity with respect to service providers 420 and 425 within the time window even if there is no explicit record that the referrals 435 and 440 ever occurred. In contrast, the activities of the consumer with the service providers 430 and 425 in time period C 470 are outside of the time window. Thus, there is no implicit connection inferred from the same consumer 405 visiting service provider 430 after having visited service provider 410.

Figure 5:
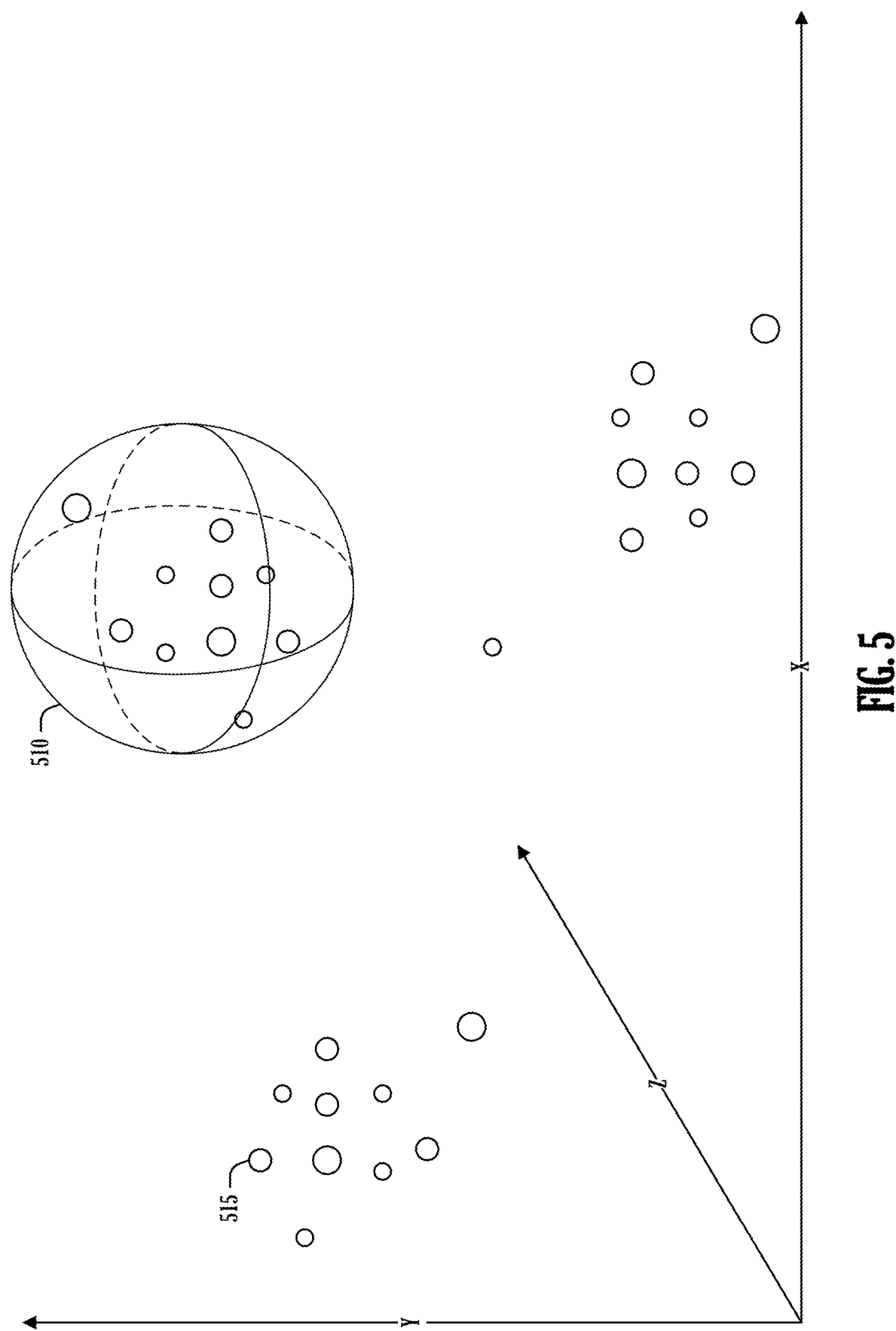
FIG. 5 illustrates an example of multi-dimensional clustering, according to an embodiment.

FIG. 5 illustrates an example of multi-dimensional clustering, according to an embodiment. As illustrated, interactions from several dimensions are considered to further refine the time-based implicit connection discussed above (e.g., with respect to FIG. 4). Dimensions may include time, geographic location, type of service provider, etc. A given service provider 515 position in the multidimensional space is represented by a vector with a normalized number for a value in each dimension. Clustering, such as k-means clustering, may define an area 510 within the multidimensional space in which data points are considered to be related. Thus, in the illustrated example, each service provider within the area 510 is considered to be connected based on the Euclidean distance between them being within the area 510.

Figure 6:
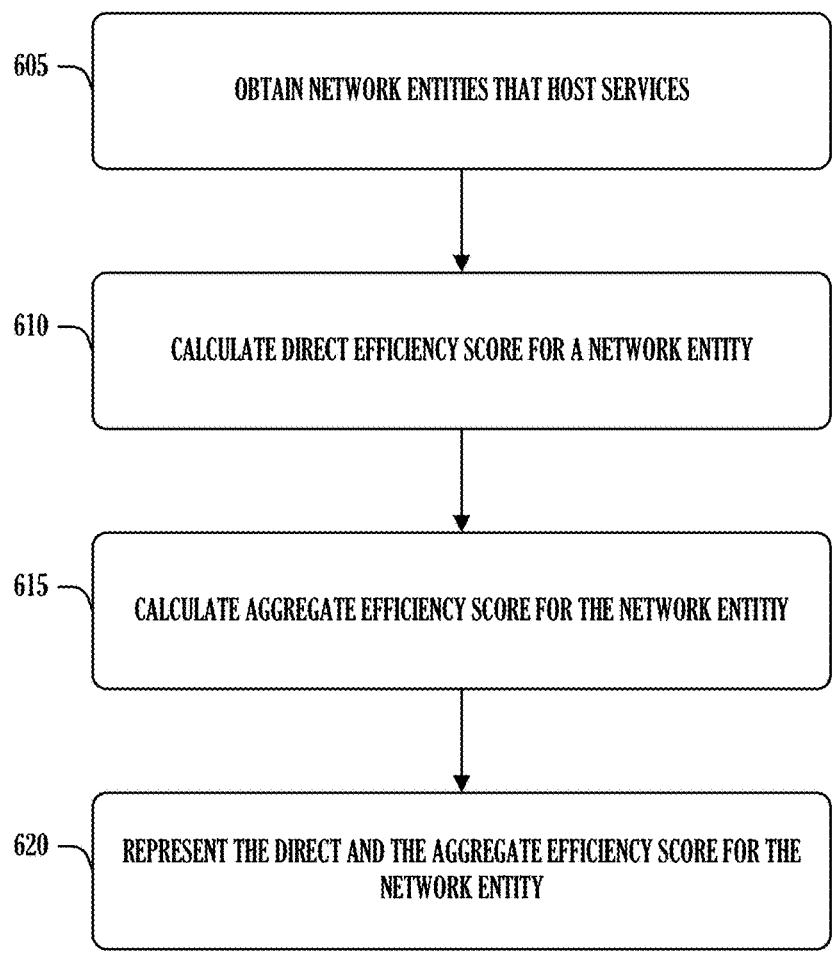
FIG. 6 illustrates a flow diagram of an example of a method for network entity modeling, according to an embodiment.

FIG. 6 illustrates a flow diagram of an example of a method 600 for network entity modeling, according to an embodiment. The operations of the method 600 are implemented in computer hardware, such as that described above or below (e.g., processing circuitry).

At operation 605, a set of network entities is obtained. A first member of the set of network entities hosts a first service and, when in operation, the first member has a connection to a second member of the set of network entities that hosts a second service. In an example, the first member also hosts a third service. This third service is a referral service to use the second service (of the second member) via the connection between the first member and the second member.

In an example, the connection between the first member and the second member is an implicit connection. In an example, the implicit connection is determined based on user use of the first service and the second service. In an example, the implicit connection is determined based the user use of the first service and the second service within a time window. In an example, the implicit connection is determined based the user use of the first service and the second service for a treatment.

In an example, the first service is a medical procedure. In an example, the first member is a building. In an example, the building is a hospital or a clinic. In an example, the first member is a medical professional. In an example, the medical professional is a physician.

At operation 610, a direct efficiency score is calculated for the first member of the set of network entities. The direct efficiency score is based on first resources required to use the first service. In an example, the first resources are a cost of using the first service over several uses. Here, the direct efficiency score is calculated by dividing the cost by the several uses.

At operation 615, an aggregate efficiency score is calculated. The aggregate efficiency score is based on second resources required to use the second service on the second member via the first member and the connection. In an example, where the first member includes the third service—the referral service to the second member—and the second resources include third resources required to use the third service. Thus, the third services impact the aggregate efficiency score.

At operation 620, a representation of the first member that includes the direct efficiency score and the aggregate efficiency score is provided. Here, providing the aggregate efficiency score includes transmitting the aggregate efficiency score, displaying the aggregate efficiency score, writing the aggregate efficiency score to a data structure (e.g., stored on a computer readable medium), or otherwise deliver the aggregate efficiency score for use in network entity modeling.

In an example, the method 600 includes the operation of obtaining a service set that defines a complete network. In this example, providing the representation of the first member includes providing an indication that either the first service or the second service is in the service set. In an example, the method 600 includes the operation of normalizing the first service to create a normalized first service. Here, providing the indication that the first service is in the service set includes comparing the normalized first service to members of the service set to find a match. In an example, normalizing the first services includes obtaining service groupings—a given service grouping including multiple services predefined to be equivalent—finding the first service in a service grouping, and using the service grouping as the normalized first service. Here the service set members are service groupings.

In an example, the method 600 includes the operation of generating a subset of network entities from the set of network entities that includes the first member based on the service set and the aggregate efficiency score. In an example, the service set is subject to a geographic limitation. Here, generating the subset of network entities includes eliminating members of the set of network entities that do not meet the geographic limitation. In an example, generating the subset of network entities that includes the first member based on the aggregate efficiency score includes determining that the first member is not in the subset of network entities based on the direct efficiency score, and comparing the aggregate efficiency score with direct or aggregate efficiency scores for other members of the set of network entities to determine that the first member is included in the subset of network entities.

In an example, the method 600 includes the operation of providing a user interface. In an example, the user interface is configured to display the subset of network entities including the first member. In an example, the user interface is configured to display the direct efficiency score. In an example, the user interface is configured to display the aggregate efficiency score. In an example, the user interface is configured to display a contribution of the first member to completion of the service set.

Figure 7:
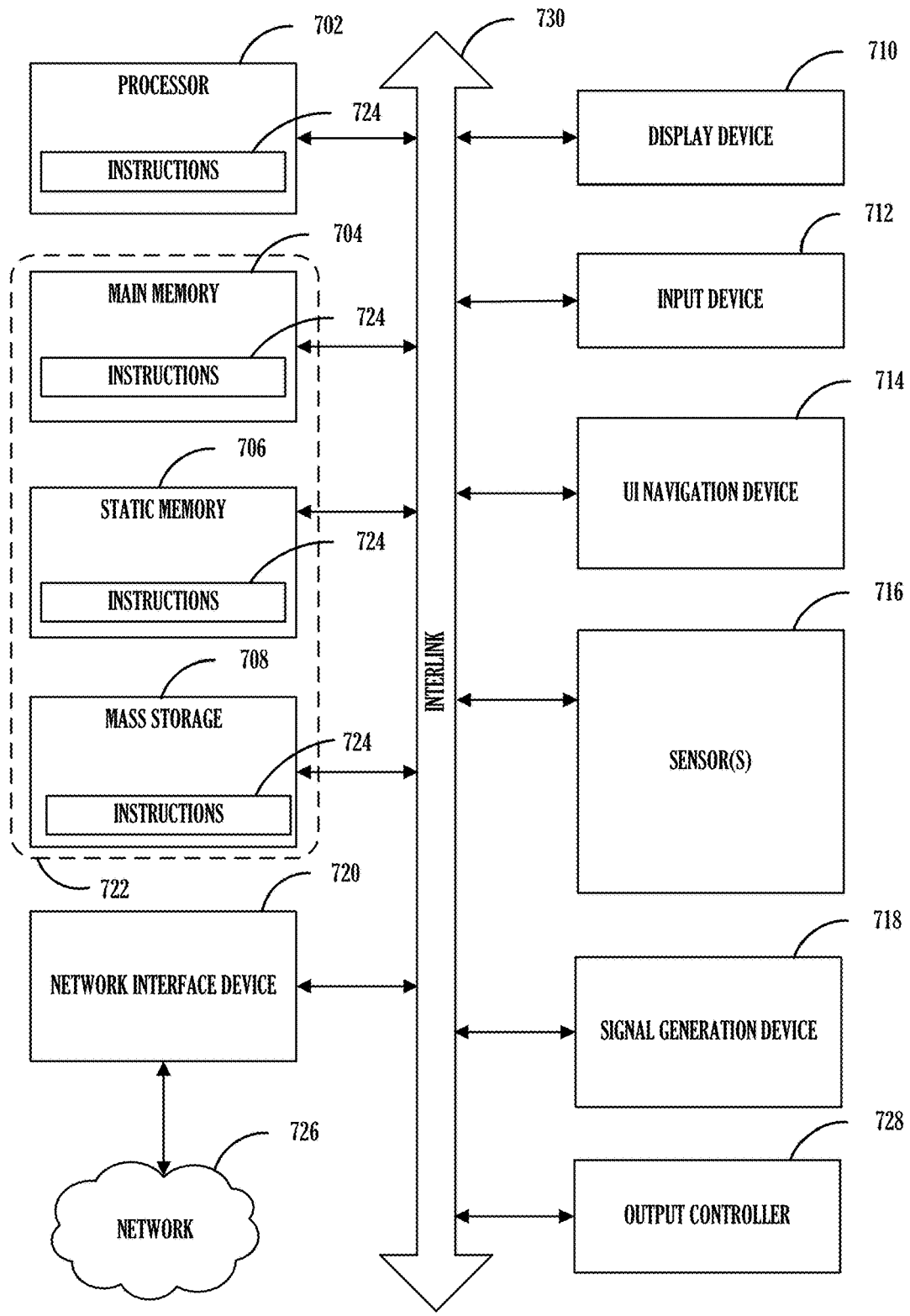
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drives, tape drives, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium includes a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 722 may be representative of the instructions 724, such as instructions 724 themselves or a format from which the instructions 724 may be derived. This format from which the instructions 724 may be derived may include source code, encoded instructions (e.g., in compressed or encrypted form), packaged instructions (e.g., split into multiple packages), or the like. The information representative of the instructions 724 in the machine readable medium 722 may be processed by processing circuitry into the instructions to implement any of the operations discussed herein. For example, deriving the instructions 724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 724.

In an example, the derivation of the instructions 724 may include assembly, compilation, or interpretation of the information (e.g., by the processing circuitry) to create the instructions 724 from some intermediate or preprocessed format provided by the machine readable medium 722. The information, when provided in multiple parts, may be combined, unpacked, and modified to create the instructions 724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Additional Notes & Examples

Example 1 is a computing device for network entity modeling, the computing device comprising: a memory including instructions; and processing circuitry that, when in operation, is configured by the instructions to: obtain a set of network entities, a first member of the set of network entities hosting a first service and, when in operation, having a connection to a second member of the set of network entities hosting a second service; calculate a direct efficiency score for the first member of the set of network entities, the direct efficiency score based on first resources required to use the first service; calculate an aggregate efficiency score, the aggregate efficiency score based on second resources required to use the second service on the second member via the first member and the connection; and provide a representation of the first member that includes the direct efficiency score and the aggregate efficiency score.

In Example 2, the subject matter of Example 1, wherein the processing circuitry is further configured by the instructions to obtain a service set that defines a complete network, and wherein, to provide the representation of the first member, the processing circuitry provides an indication that either the first service or the second service is in the service set.

In Example 3, the subject matter of Example 2, the processing circuitry is further configured by the instructions to normalize the first service to create a normalized first service, and wherein, to provide the indication that the first service is in the service set, the processing circuitry compares the normalized first service to members of the service set to find a match.

In Example 4, the subject matter of Example 3, wherein, to normalize the first services, the processing circuitry is configured by the instructions to: obtain service groupings, a given service grouping including multiple services predefined to be equivalent; find the first service in a service grouping; and use the service grouping as the normalized first service, wherein the service set members are service groupings.

In Example 5, the subject matter of any of Examples 2-4, the processing circuitry is further configured by the instructions to generate a subset of network entities from the set of network entities that includes the first member based on the service set and the aggregate efficiency score.

In Example 6, the subject matter of Example 5, wherein, to generate the subset of network entities that includes the first member based on the aggregate efficiency score, the instructions configured the processing circuitry to: determine that the first member is not in the subset of network entities based on the direct efficiency score; and compare the aggregate efficiency score with direct or aggregate efficiency scores for other members of the set of network entities to determine that the first member is included in the subset of network entities.

In Example 7, the subject matter of any of Examples 5-6, wherein the service set is subject to a geographic limitation, and wherein, to generate the subset of network entities, the processing circuitry eliminates members of the set of network entities that do not meet the geographic limitation.

In Example 8, the subject matter of any of Examples 1-7, the processing circuitry is further configured by the instructions to provide a user interface configured to: display the subset of network entities including the first member; display the direct efficiency score; display the aggregate efficiency score; and display a contribution of the first member to completion of the service set.

In Example 9, the subject matter of any of Examples 1-8, wherein the first member hosts a third service, wherein the third service is a referral service to use the second service via the connection, wherein the second resources include third resources required to use the third service.

In Example 10, the subject matter of any of Examples 1-9, wherein the connection between the first member and the second member is an implicit connection.

In Example 11, the subject matter of Example 10, wherein the implicit connection is determined based on user use of the first service and the second service.

In Example 12, the subject matter of Example 11, wherein the implicit connection is determined based the user use of the first service and the second service within a time window.

In Example 13, the subject matter of any of Examples 11-12, wherein the implicit connection is determined based the user use of the first service and the second service for a treatment.

In Example 14, the subject matter of any of Examples 1-13, wherein the first resources are a cost of using the first service over several uses, and wherein the direct efficiency score is calculated by dividing the cost by the several uses.

In Example 15, the subject matter of any of Examples 1-14, wherein the first service is a medical procedure.

In Example 16, the subject matter of Example 15, wherein the first member is a building.

In Example 17, the subject matter of Example 16, wherein the building is a hospital or a clinic.

In Example 18, the subject matter of any of Examples 15-17, wherein the first member is a medical professional.

In Example 19, the subject matter of Example 18, wherein the medical professional is a physician.

Example 20 is a method for network entity modeling, the method comprising: obtaining a set of network entities, a first member of the set of network entities hosting a first service and, when in operation, having a connection to a second member of the set of network entities hosting a second service; calculating a direct efficiency score for the first member of the set of network entities, the direct efficiency score based on first resources required to use the first service; calculating an aggregate efficiency score, the aggregate efficiency score based on second resources required to use the second service on the second member via the first member and the connection; and providing a representation of the first member that includes the direct efficiency score and the aggregate efficiency score.

In Example 21, the subject matter of Example 20, comprising obtaining a service set that defines a complete network, wherein providing the representation of the first member includes providing an indication that either the first service or the second service is in the service set.

In Example 22, the subject matter of Example 21, comprising normalizing the first service to create a normalized first service, wherein providing the indication that the first service is in the service set includes comparing the normalized first service to members of the service set to find a match.

In Example 23, the subject matter of Example 22, wherein normalizing the first services includes: obtaining service groupings, a given service grouping including multiple services predefined to be equivalent; finding the first service in a service grouping; and using the service grouping as the normalized first service, wherein the service set members are service groupings.

In Example 24, the subject matter of any of Examples 21-23, comprising generating a subset of network entities from the set of network entities that includes the first member based on the service set and the aggregate efficiency score.

In Example 25, the subject matter of Example 24, wherein generating the subset of network entities that includes the first member based on the aggregate efficiency score includes: determining that the first member is not in the subset of network entities based on the direct efficiency score; and comparing the aggregate efficiency score with direct or aggregate efficiency scores for other members of the set of network entities to determine that the first member is included in the subset of network entities.

In Example 26, the subject matter of any of Examples 24-25, wherein the service set is subject to a geographic limitation, and wherein generating the subset of network entities includes eliminating members of the set of network entities that do not meet the geographic limitation.

In Example 27, the subject matter of any of Examples 20-26, comprising providing a user interface configured to: display the subset of network entities including the first member; display the direct efficiency score; display the aggregate efficiency score; and display a contribution of the first member to completion of the service set.

In Example 28, the subject matter of any of Examples 20-27, wherein the first member hosts a third service, wherein the third service is a referral service to use the second service via the connection, wherein the second resources include third resources required to use the third service.

In Example 29, the subject matter of any of Examples 20-28, wherein the connection between the first member and the second member is an implicit connection.

In Example 30, the subject matter of Example 29, wherein the implicit connection is determined based on user use of the first service and the second service.

In Example 31, the subject matter of Example 30, wherein the implicit connection is determined based the user use of the first service and the second service within a time window.

In Example 32, the subject matter of any of Examples 30-31, wherein the implicit connection is determined based the user use of the first service and the second service for a treatment.

In Example 33, the subject matter of any of Examples 20-32, wherein the first resources are a cost of using the first service over several uses, and wherein the direct efficiency score is calculated by dividing the cost by the several uses.

In Example 34, the subject matter of any of Examples 20-33, wherein the first service is a medical procedure.

In Example 35, the subject matter of Example 34, wherein the first member is a building.

In Example 36, the subject matter of Example 35, wherein the building is a hospital or a clinic.

In Example 37, the subject matter of any of Examples 34-36, wherein the first member is a medical professional.

In Example 38, the subject matter of Example 37, wherein the medical professional is a physician.

Example 39 is a machine readable medium including instructions for network entity modeling, the instructions, when executed by processing circuitry, cause the processing circuitry to perform operations comprising: obtaining a set of network entities, a first member of the set of network entities hosting a first service and, when in operation, having a connection to a second member of the set of network entities hosting a second service; calculating a direct efficiency score for the first member of the set of network entities, the direct efficiency score based on first resources required to use the first service; calculating an aggregate efficiency score, the aggregate efficiency score based on second resources required to use the second service on the second member via the first member and the connection; and providing a representation of the first member that includes the direct efficiency score and the aggregate efficiency score.

In Example 40, the subject matter of Example 39, wherein the operations comprise obtaining a service set that defines a complete network, wherein providing the representation of the first member includes providing an indication that either the first service or the second service is in the service set.

In Example 41, the subject matter of Example 40, wherein the operations comprise normalizing the first service to create a normalized first service, wherein providing the indication that the first service is in the service set includes comparing the normalized first service to members of the service set to find a match.

In Example 42, the subject matter of Example 41, wherein normalizing the first services includes: obtaining service groupings, a given service grouping including multiple services predefined to be equivalent; finding the first service in a service grouping; and using the service grouping as the normalized first service, wherein the service set members are service groupings.

In Example 43, the subject matter of any of Examples 40-42, wherein the operations comprise generating a subset of network entities from the set of network entities that includes the first member based on the service set and the aggregate efficiency score.

In Example 44, the subject matter of Example 43, wherein generating the subset of network entities that includes the first member based on the aggregate efficiency score includes: determining that the first member is not in the subset of network entities based on the direct efficiency score; and comparing the aggregate efficiency score with direct or aggregate efficiency scores for other members of the set of network entities to determine that the first member is included in the subset of network entities.

In Example 45, the subject matter of any of Examples 43-44, wherein the service set is subject to a geographic limitation, and wherein generating the subset of network entities includes eliminating members of the set of network entities that do not meet the geographic limitation.

In Example 46, the subject matter of any of Examples 39-45, wherein the operations comprise providing a user interface configured to: display the subset of network entities including the first member; display the direct efficiency score; display the aggregate efficiency score; and display a contribution of the first member to completion of the service set.

In Example 47, the subject matter of any of Examples 39-46, wherein the first member hosts a third service, wherein the third service is a referral service to use the second service via the connection, wherein the second resources include third resources required to use the third service.

In Example 48, the subject matter of any of Examples 39-47, wherein the connection between the first member and the second member is an implicit connection.

In Example 49, the subject matter of Example 48, wherein the implicit connection is determined based on user use of the first service and the second service.

In Example 50, the subject matter of Example 49, wherein the implicit connection is determined based the user use of the first service and the second service within a time window.

In Example 51, the subject matter of any of Examples 49-50, wherein the implicit connection is determined based the user use of the first service and the second service for a treatment.

In Example 52, the subject matter of any of Examples 39-51, wherein the first resources are a cost of using the first service over several uses, and wherein the direct efficiency score is calculated by dividing the cost by the several uses.

In Example 53, the subject matter of any of Examples 39-52, wherein the first service is a medical procedure.

In Example 54, the subject matter of Example 53, wherein the first member is a building.

In Example 55, the subject matter of Example 54, wherein the building is a hospital or a clinic.

In Example 56, the subject matter of any of Examples 53-55, wherein the first member is a medical professional.

In Example 57, the subject matter of Example 56, wherein the medical professional is a physician.

Example 58 is a system for network entity modeling, the system comprising: means for obtaining a set of network entities, a first member of the set of network entities hosting a first service and, when in operation, having a connection to a second member of the set of network entities hosting a second service; means for calculating a direct efficiency score for the first member of the set of network entities, the direct efficiency score based on first resources required to use the first service; means for calculating an aggregate efficiency score, the aggregate efficiency score based on second resources required to use the second service on the second member via the first member and the connection; and means for providing a representation of the first member that includes the direct efficiency score and the aggregate efficiency score.

In Example 59, the subject matter of Example 58, comprising means for obtaining a service set that defines a complete network, wherein the means for providing the representation of the first member include means for providing an indication that either the first service or the second service is in the service set.

In Example 60, the subject matter of Example 59, comprising means for normalizing the first service to create a normalized first service, wherein the means for providing the indication that the first service is in the service set include means for comparing the normalized first service to members of the service set to find a match.

In Example 61, the subject matter of Example 60, wherein the means for normalizing the first services include: means for obtaining service groupings, a given service grouping including multiple services predefined to be equivalent; means for finding the first service in a service grouping; and means for using the service grouping as the normalized first service, wherein the service set members are service groupings.

In Example 62, the subject matter of any of Examples 59-61, comprising means for generating a subset of network entities from the set of network entities that includes the first member based on the service set and the aggregate efficiency score.

In Example 63, the subject matter of Example 62, wherein the means for generating the subset of network entities that includes the first member based on the aggregate efficiency score include: means for determining that the first member is not in the subset of network entities based on the direct efficiency score; and means for comparing the aggregate efficiency score with direct or aggregate efficiency scores for other members of the set of network entities to determine that the first member is included in the subset of network entities.

In Example 64, the subject matter of any of Examples 62-63, wherein the service set is subject to a geographic limitation, and wherein the means for generating the subset of network entities include means for eliminating members of the set of network entities that do not meet the geographic limitation.

In Example 65, the subject matter of any of Examples 58-64, comprising means for providing a user interface configured to: display the subset of network entities including the first member; display the direct efficiency score; display the aggregate efficiency score; and display a contribution of the first member to completion of the service set.

In Example 66, the subject matter of any of Examples 58-65, wherein the first member hosts a third service, wherein the third service is a referral service to use the second service via the connection, wherein the second resources include third resources required to use the third service.

In Example 67, the subject matter of any of Examples 58-66, wherein the connection between the first member and the second member is an implicit connection.

In Example 68, the subject matter of Example 67, wherein the implicit connection is determined based on user use of the first service and the second service.

In Example 69, the subject matter of Example 68, wherein the implicit connection is determined based the user use of the first service and the second service within a time window.

In Example 70, the subject matter of any of Examples 68-69, wherein the implicit connection is determined based the user use of the first service and the second service for a treatment.

In Example 71, the subject matter of any of Examples 58-70, wherein the first resources are a cost of using the first service over several uses, and wherein the direct efficiency score is calculated by dividing the cost by the several uses.

In Example 72, the subject matter of any of Examples 58-71, wherein the first service is a medical procedure.

In Example 73, the subject matter of Example 72, wherein the first member is a building.

In Example 74, the subject matter of Example 73, wherein the building is a hospital or a clinic.

In Example 75, the subject matter of any of Examples 72-74, wherein the first member is a medical professional.

In Example 76, the subject matter of Example 75, wherein the medical professional is a physician.

Example 77 is at least one machine-readable medium including instructions that, when executed by processing circuitry, cause the processing circuitry to perform operations to implement of any of Examples 1-76.

Example 78 is an apparatus comprising means to implement of any of Examples 1-76.

Example 79 is a system to implement of any of Examples 1-76.

Example 80 is a method to implement of any of Examples 1-76.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A non-transitory machine readable medium including instructions for network entity modeling, the instructions, when executed by processing circuitry, cause the processing circuitry to perform operations comprising:
   obtaining a set of network entities, a first member of the set of network entities hosting a first service and, when in operation, having a connection to a second member of the set of network entities hosting a second service;
   calculating a direct score for the first member of the set of network entities, the direct score based on first resources required to use the first service;

calculating an aggregate score, the aggregate score based on second resources required to use the second service on the second member via the first member and the connection;

providing a representation of the first member that includes the direct score and the aggregate score; and providing a user interface configured to:
  display a subset of network entities including the first member;
  display the direct score;
  display the aggregate score; and
  display a contribution of the first member to completion of a service set.

2. The non-transitory machine readable medium of claim 1, wherein the operations comprise obtaining the service set that defines a complete network, wherein providing the representation of the first member includes providing an indication that either the first service or the second service is in the service set.

3. The non-transitory machine readable medium of claim 2, wherein the operations comprise normalizing the first service to create a normalized first service, wherein providing the indication that the first service is in the service set includes comparing the normalized first service to members of the service set to find a match.

4. The non-transitory machine readable medium of claim 3, wherein normalizing the first service includes:
  obtaining service groupings, a given service grouping including multiple services predefined to be equivalent;
  finding the first service in a service grouping; and
  using the service grouping as the normalized first service, wherein members of the service set are service groupings.

5. The non-transitory machine readable medium of claim 2, wherein the operations comprise generating a subset of network entities from the set of network entities that includes the first member based on the service set and the aggregate score.

6. The non-transitory machine readable medium of claim 5, wherein generating the subset of network entities that includes the first member based on the aggregate score includes:
  determining that the first member is not in the subset of network entities based on the direct score; and
  comparing the aggregate score with direct or aggregate scores for other members of the set of network entities to determine that the first member is included in the subset of network entities.

7. The non-transitory machine readable medium of claim 5, wherein the service set is subject to a geographic limitation, and wherein generating the subset of network entities includes eliminating members of the set of network entities that do not meet the geographic limitation.

8. The non-transitory machine readable medium of claim 1, wherein the first member hosts a third service, wherein the third service is a referral service to use the second service via the connection, wherein the second resources include third resources required to use the third service.

9. The non-transitory machine readable medium of claim 1, wherein the connection between the first member and the second member is an implicit connection.

10. The non-transitory machine readable medium of claim 9, wherein the implicit connection is determined based on user use of the first service and the second service.

11. The non-transitory machine readable medium of claim 10, wherein the implicit connection is determined based on the user use of the first service and the second service within a time window.

12. A method for network entity modeling, the method comprising:
  obtaining a set of network entities, a first member of the set of network entities hosting a first service and, when in operation, having a connection to a second member of the set of network entities hosting a second service;
  calculating a direct score for the first member of the set of network entities, the direct score based on first resources required to use the first service;
  calculating an aggregate score, the aggregate score based on second resources required to use the second service on the second member via the first member and the connection;
  providing a representation of the first member that includes the direct score and the aggregate score; and
  providing a user interface configured to:
    display a subset of network entities including the first member;
    display the direct score;
    display the aggregate score; and
    display a contribution of the first member to completion of a service set.

13. The method of claim 12, comprising obtaining the service set that defines a complete network, wherein providing the representation of the first member includes providing an indication that either the first service or the second service is in the service set.

14. The method of claim 13, comprising normalizing the first service to create a normalized first service, wherein providing the indication that the first service is in the service set includes comparing the normalized first service to members of the service set to find a match.

15. The method of claim 14, wherein normalizing the first service includes:
  obtaining service groupings, a given service grouping including multiple services predefined to be equivalent;
  finding the first service in a service grouping; and
  using the service grouping as the normalized first service, wherein members of the service set are service groupings.

16. The method of claim 13, comprising generating a subset of network entities from the set of network entities that includes the first member based on the service set and the aggregate score.

17. The method of claim 16, wherein generating the subset of network entities that includes the first member based on the aggregate score includes:
  determining that the first member is not in the subset of network entities based on the direct score; and
  comparing the aggregate score with direct or aggregate scores for other members of the set of network entities to determine that the first member is included in the subset of network entities.

18. The method of claim 16, wherein the service set is subject to a geographic limitation, and wherein generating the subset of network entities includes eliminating members of the set of network entities that do not meet the geographic limitation.

19. The method of claim 12, wherein the first member hosts a third service, wherein the third service is a referral service to use the second service via the connection, wherein the second resources include third resources required to use the third service.

20. The method of claim 12, wherein the connection between the first member and the second member is an implicit connection.

21. The method of claim 20, wherein the implicit connection is determined based on user use of the first service and the second service.

22. The method of claim 21, wherein the implicit connection is determined based on the user use of the first service and the second service within a time window.

23. A method for network entity modeling, the method comprising:
   obtaining a set of network entities, a first member of the set of network entities hosting a first service and, when in operation, having a connection to a second member of the set of network entities hosting a second service;
   normalizing the first service to create a normalized first service;
   obtaining a service set that defines a complete network;
   calculating a direct score for the first member of the set of network entities, the direct score based on first resources required to use the first service;
   calculating an aggregate score, the aggregate score based on second resources required to use the second service on the second member via the first member and the connection; and
   providing a representation of the first member that includes the direct score and the aggregate score, wherein providing the representation of the first member includes providing an indication that either the first service or the second service is in the service set, and wherein providing the indication that the first service is in the service set includes comparing the normalized first service to members of the service set to find a match.

24. The method of claim 23, wherein normalizing the first service includes:
   obtaining service groupings, a given service grouping including multiple services predefined to be equivalent;
   finding the first service in a service grouping; and
   using the service grouping as the normalized first service, wherein members of the service set are service groupings.

* * * * *